United States Patent
Emmerich et al.

(10) Patent No.: US 6,211,503 B1
(45) Date of Patent: Apr. 3, 2001

(54) DEVICE AND METHOD OF HEATING COMPONENTS MADE OF MICROWAVE ABSORBING PLASTIC

(75) Inventors: Rudolf Emmerich, Eppingen; Horst Mugge, Reichelsheim; Armin Dommer, Eichweg 13, 71254 Ditzingen; Michael Jauss, Mossingen, all of (DE)

(73) Assignees: Fraunhofer Gesellschaft zur Forderung der angeandten Forschung e.V, Munich; Mugge Electronic, Reichelstein; Armin Dommer, Ditzinger, all of (DE)

( * ) Notice: Subject to any disclaimer, the term of this patent is extended or adjusted under 35 U.S.C. 154(b) by 0 days.

(21) Appl. No.: 09/399,556

(22) Filed: Sep. 20, 1999

(30) Foreign Application Priority Data

Sep. 29, 1998 (DE) .............................. 198 44 549

(51) Int. Cl.[7] .............................. H05B 6/72; H05B 6/80
(52) U.S. Cl. ..................... 219/748; 219/749; 219/695; 219/693; 219/762; 264/405; 264/432; 264/489; 425/174.8 R
(58) Field of Search .................... 219/690, 691, 219/692, 693, 695, 696, 697, 746, 748, 749, 756, 762; 264/405, 432, 474, 489, 490; 425/174.8 R

(56) References Cited

U.S. PATENT DOCUMENTS

| | | | |
|---|---|---|---|
| 2,811,624 | * 10/1957 | Haagensen | 219/748 |
| 3,265,780 | * 8/1966 | Long | 219/750 |
| 3,851,131 | * 11/1974 | Johnston et al. | 219/693 |
| 4,147,912 | * 4/1979 | Uyeda | 219/748 |
| 4,339,295 | 7/1982 | Boretos et al. | |
| 4,339,648 | * 7/1982 | Jean | 219/693 |
| 4,392,039 | * 7/1983 | Risman | 219/691 |
| 4,571,473 | * 2/1986 | Wyslouzil et al. | 219/690 |
| 5,254,824 | 10/1993 | Chamberlain et al. | |
| 5,457,303 | 10/1995 | Shute et al. | |

FOREIGN PATENT DOCUMENTS

| | | |
|---|---|---|
| 28 44 128 | 4/1979 | (DE) . |
| 41 23 921 A1 | 1/1993 | (DE) . |
| 44 34 426 A1 | 5/1996 | (DE) . |
| 0 792 085 | 8/1997 | (EP) . |
| 2 490 057 | 9/1980 | (FR) . |
| 2 240 980 | 8/1991 | (GB) . |
| WO 86/02229 | 9/1985 | (WO) . |

OTHER PUBLICATIONS

Patent Abstracts of Japan vol. 1996, No. 3, Mar. 29, 1996 for application No. 06103783, application date May 18, 1994.
European Search Report dated Dec. 17, 1999 for application No. EP 99 11 8659.

* cited by examiner

Primary Examiner—Philip H. Leung
(74) Attorney, Agent, or Firm—Pitney, Hardin, Kipp & Szuch, LLP

(57) ABSTRACT

With a device for heating parts 8 made of a microwave absorbing plastic and having a microwave generator 1 that generates microwaves of a certain wavelength, an antenna 4 to which the microwaves are conducted, having at least one free end 5 and a device 6 which surrounds the antenna 4, it is proposed that the device for shielding 6 be designed with a tubular shape, so that the device 6 has an inside diameter smaller than half the wavelength, projects beyond the free end 5 of the antenna and has an opening 7 in its end face. With this device it is possible to achieve a spatially limited and nevertheless homogeneous heating of parts 8. Furthermore a method of heating or welding, shaping or crosslinking parts made of a microwave absorbing plastic using this device is also proposed.

15 Claims, 5 Drawing Sheets

DEVICE AND METHOD OF HEATING COMPONENTS MADE OF MICROWAVE ABSORBING PLASTIC

FIELD OF THE INVENTION

The present invention concerns a device for heating parts made of one or more microwave absorbing plastics containing microwave absorbing additives, having a microwave generator that generates microwaves of a certain wavelength, having an antenna to which the microwaves are aimed, having at least one free end, and having a device for shielding surrounding the antenna. In addition, this invention concerns a method of heating parts made of a microwave absorbing plastic.

BACKGROUND OF THE INVENTION

Microwaves are understood to be electromagnetic radiation in a frequency range of approximately 300 MHz to 300 GHz generated with the help of microwave generators. Microwaves are sent from a microwave generator through a hollow conductor or coaxial cable to their site of use where they are output via an antenna, for example, which projects by at least one quarter of the wavelength into a shielded chamber. In this chamber, the microwaves interact with the parts to be heated.

For heating parts by means of microwaves, in principle two different devices are differentiated:

With one device, the microwaves are radiated into a chamber whose dimensions are much larger than the wavelength. The microwaves are reflected on the walls of the chamber and are superimposed to form a complex field distribution (multimode). However, microwaves cannot be concentrated spatially in such a chamber, so defined heating of certain sections of a part is not possible. The chamber has the function of determining the field distribution and protecting the operator of the device from microwaves.

With the other device, the microwaves are radiated into a chamber whose dimensions correspond approximately to the wavelength, so that a defined field distribution (monomode) develops within the chamber. However, with such a chamber, defined spatial heating of parts can be achieved only to a limited extent, because this field distribution is not homogeneous in space. Thus, the chamber here has the function of defining the field distribution and again protecting the operator from microwaves.

With these devices from the related art, the parts can thus be heated only as a whole or in nonhomogeneous sections, although that is neither desirable nor necessary for most applications. Furthermore, implementation of an opening necessary for introduction of the parts into the shielded chamber is complicated with these devices, because such openings in that location are feasible only by means of doors or microwave absorbers.

SUMMARY OF THE INVENTION

Against this background, the object of the present invention is to design a device for heating parts of microwave absorbing plastics in such a way as to allow spatially limited but nevertheless homogeneous heating of the parts. Furthermore, an opening for the parts to be introduced is to be created in a simple manner with this device. In addition, a method of heating parts made of a microwave absorbing plastic is to be provided.

With the device according to this invention, this object is achieved by a device for heating parts made of microwave absorbing plastics.

Since the device for shielding is designed in a tube shape, with the device having an inside diameter smaller than half the wavelength and projecting beyond the free end of the antenna, the antenna can emit practically no microwaves into the free space. With these dimensions, there is exponential damping of the microwaves. Therefore, almost all the electromagnetic energy is concentrated in the narrow zone between the free end of the antenna and the device for shielding, so a very strong electromagnetic field prevails in this zone. As a result, a spatially limited or precisely defined heating of the parts takes place within the zone, but there is no heating of the parts outside the zone.

Since the device for shielding has an opening in the end face, this forms an opening through which the parts to be heated can be inserted into the zone between the free end of the antenna and the device. This opening need not be closed while the parts are being heated, because in this way practically no microwaves can be radiated into the free space. This offers the possibility of inserting only a section of the part into the zone between the device and the antenna and thus heating only that section, while the remainder of the part, which may project out of the opening, is not being heated.

To prevent microwaves from propagating in the free space, the device for shielding should project beyond the free end of the antenna by at least one quarter of the wavelength of the microwaves generated by the microwave generator. With this feature, emission of microwaves into the space is reliably suppressed. However, if the device projects beyond the free end of the antenna by only a small extent, emission of the microwaves is no longer suppressed so reliably. However, effective heating of the parts is possible in both cases.

It is expedient for the zone between the free end of the antenna and the device for shielding to be designed with dimensions that depend on the dimensions of the parts to be heated. Essentially, the electromagnetic field will be more pronounced, the narrower the zone or the smaller the distance between the free end of the antenna and the device for shielding. With such a strong electromagnetic field, a high energy density and thus optimum utilization of the energy input are achieved. However it is important for the parts to be inserted into the zone without contact in order to avoid soiling of the device in particular when the parts are heated to temperatures above the melting point. In addition, the longer the zone, the larger may be the spatially limited or precisely defined section of the part which is heated.

The zone between the free end of the antenna and the tubular device for shielding is advantageously designed to be especially narrow in one area in order to be able to heat the parts introduced into the zone in a spatially limited or precisely defined manner precisely in this area. This permits good handling of parts for the first time in welding, shaping or crosslinking since the parts remain cool outside the precisely defined area. Furthermore, the microwave energy applied can also be utilized with an extremely high efficiency.

It is especially advantageous that the parts introduced into the zone can be heated within the narrow area in accordance with the respective requirements, so that suitable heating of the parts can be implemented, depending on whether welding, shaping or crosslinking is to be performed.

If a dielectric is provided between the antenna and the device for shielding, it may serve for optimum positioning of the parts to be heated because the dielectric determines the extent to which the parts can be introduced into the device. Furthermore, such a dielectric represents a cold contact surface for the parts to be heated, which can prevent an excessive welding bead on the inside in welding tubular parts, for example.

In a preferred first embodiment of this invention, the free end of the antenna is conical in shape. The electromagnetic field that develops in the zone between the free end of the antenna and the device for shielding is designed to be the strongest here in the narrowest area of the zone, so this zone is especially suitable for welding parts. To do so, two parts that are to be welded together may be introduced at one end into the zone between the free end of the antenna and the device for shielding, heated there and then welded together. In a refinement of this embodiment, the device for welding tubular parts may have an antenna with two free ends to heat the end faces of the two tubes to be welded together simultaneously to a temperature above the melting point. The two free ends of the antenna should point in opposite directions.

According to a second embodiment of this invention, the free end of the antenna is designed in a mandrel shape. The mandrel-shaped end of the antenna serves to widen tubular parts which are pushed onto the free end of the antenna and are heated to a temperature above the deformation temperature within the zone between the free end of the antenna and the device for shielding.

In another embodiment of this invention, the free end of the antenna is designed in a rod shape. The parts may be inserted into the zone between the free end of the antenna and the device, heated to a temperature above the deformation point and thus permanently shaped.

All the embodiments wherein the free end of the antenna has a rotationally symmetrical design and is arranged coaxially with the device for shielding have a radial electromagnetic field distribution and thus accomplish a homogeneous heating of the parts introduced into the zone between the free end of the antenna and the device. However, if the free end of the antenna is not rotationally symmetrical in design but instead has a hook shape or a triangular cross section or if it is not arranged coaxially with the device for shielding, then the electromagnetic field distribution is not radial and there is no homogeneous heating of the parts introduced into the zone between the free end of the antenna and the device. However, these embodiments can be used for crosslinking the parts at certain locations or along certain lines.

With the method according to this invention, this object is achieved by using the device according to this invention for heating parts made of a microwave absorbing plastic.

The parts can be heated to a temperature above the melting point and then welded together in the zone between the free end of the antenna and the device for shielding, or they can be heated to a temperature above the plastic deformation temperature and permanently shaped or heated to a temperature above the crosslinking temperature and crosslinked. Crosslinking takes place through thermal decomposition of an agent that forms free radicals.

BRIEF DESCRIPTION OF THE DRAWINGS

The present invention will now be explained in greater detail with reference to the following figures, which show.

DETAILED DESCRIPTION OF THE PREFERRED EMBODIMENT

Figure 1:
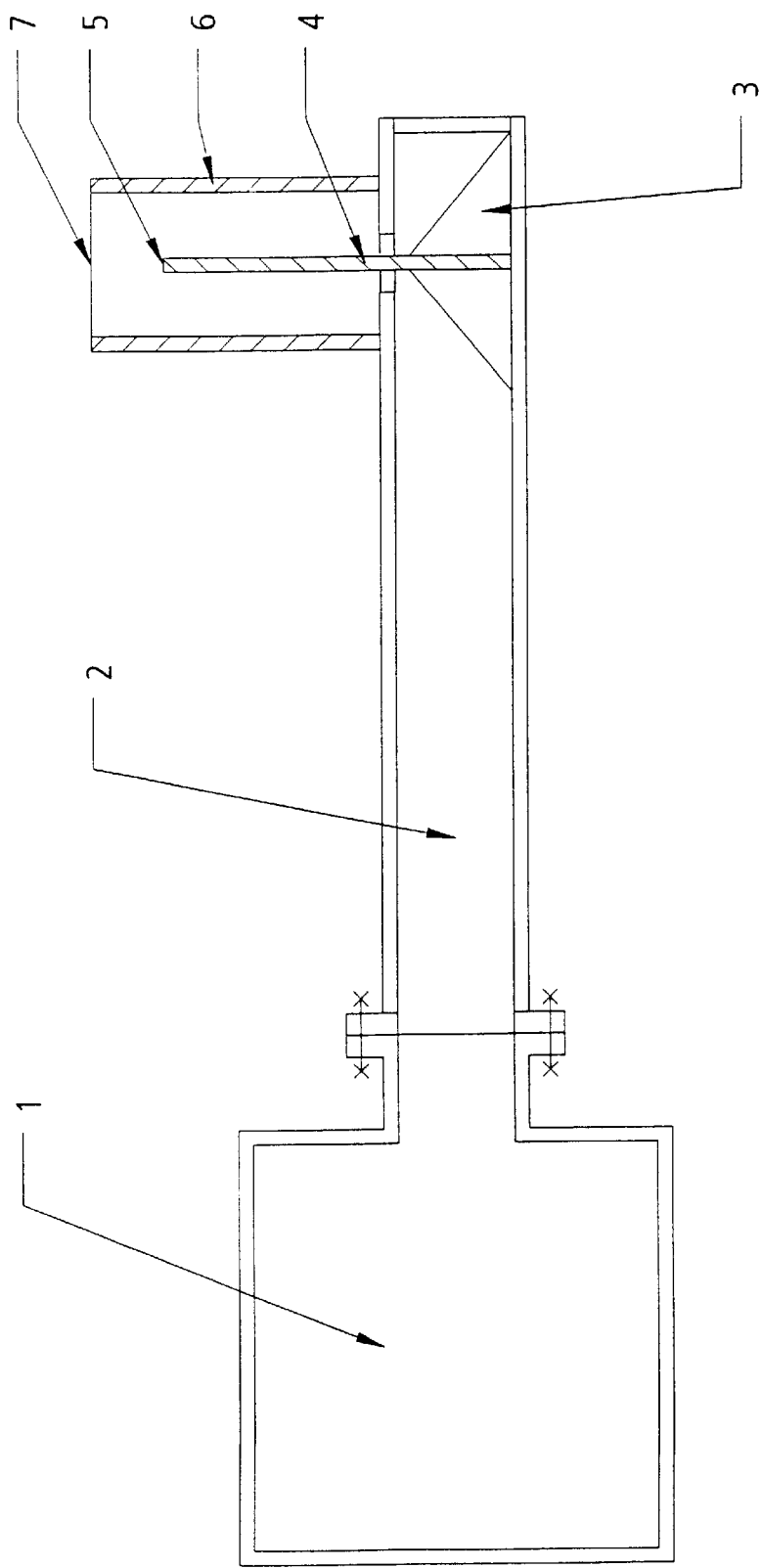
FIG. 1 a schematic diagram of the device according to this invention with a microwave generator, a hollow conductor, an induction device, an antenna and a device for shielding.

FIG. 1 shows the entire device. Microwave generator 1 of this device generates microwaves at a frequency of 2.25 GHz and a wavelength of approximately 120 mm in the present case. The microwaves go from the microwave generator 1 over a hollow conductor 2 to a device for coupling 3 and finally over this device for coupling 3 to an antenna 4. A tubular device 6 made of metal for shielding is provided so that the antenna 4 cannot emit any microwaves into the free space. This device 6 has an inside diameter of approximately 40 mm (so it is smaller than half the wavelength) and it projects by at least 30 mm (i.e., a quarter of the wavelength) beyond the free end 5 of the antenna 4. The tubular device 6 also has an opening 7 at the end. Parts 8 which are to be heated are made of a microwave absorbing plastic such as a polyamide [nylon], polyvinyl chloride or polyvinylidine fluoride; these parts are introduced through opening 7 into the zone 9 between the free end 5 of the antenna 4 and the device 6 for shielding. The zone 9 is advantageously designed with dimensions that depend on the size of the parts 8 to be heated or that depend on the size of the areas of those parts 8 which are to be heated. However, parts made of other materials, in particular materials that conduct electricity, should not be introduced into this device because they could allow microwaves to escape from the device.

Figure 2:
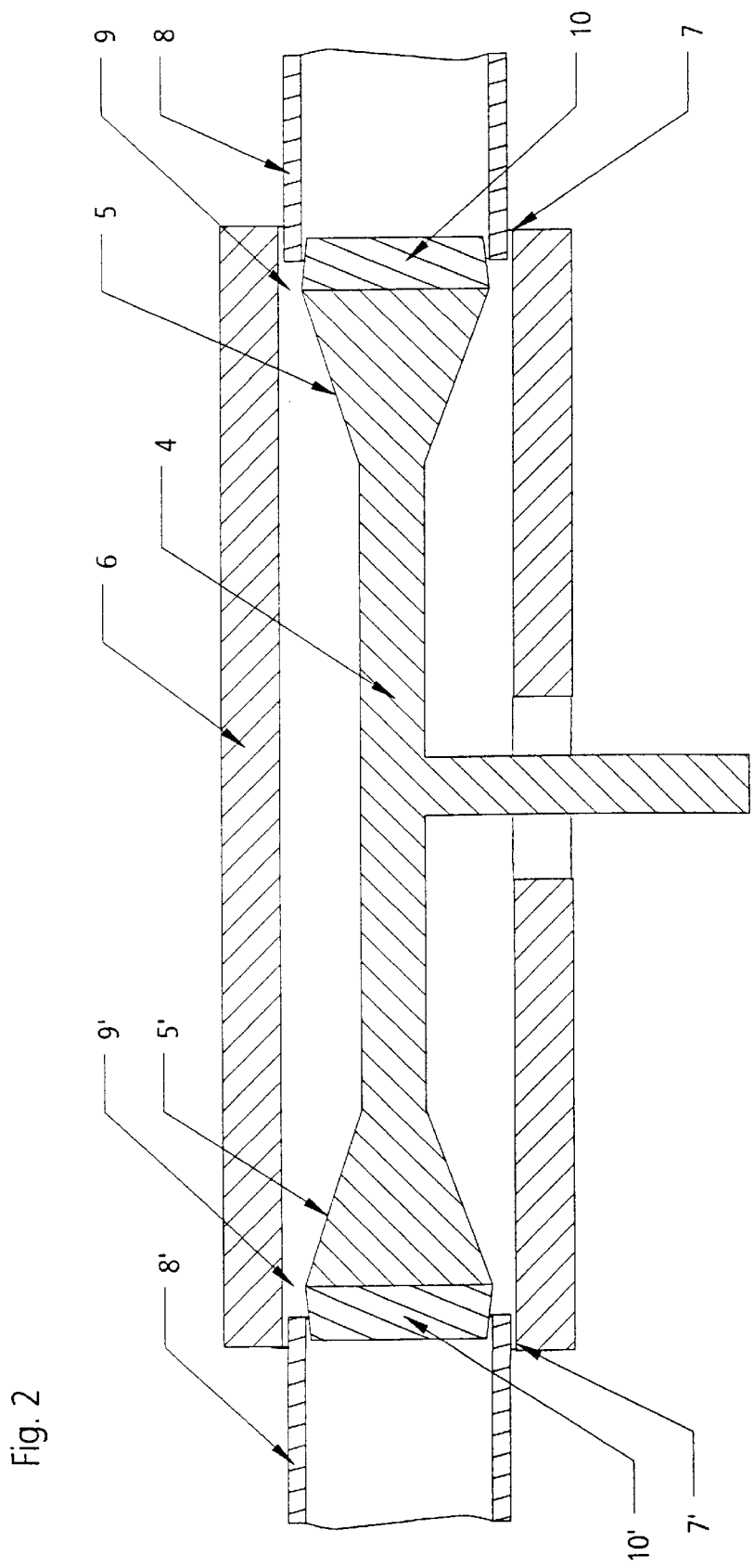
FIG. 2 a first preferred embodiment of the antenna and the device for shielding for the purpose of welding tubular parts.
Figure 3:
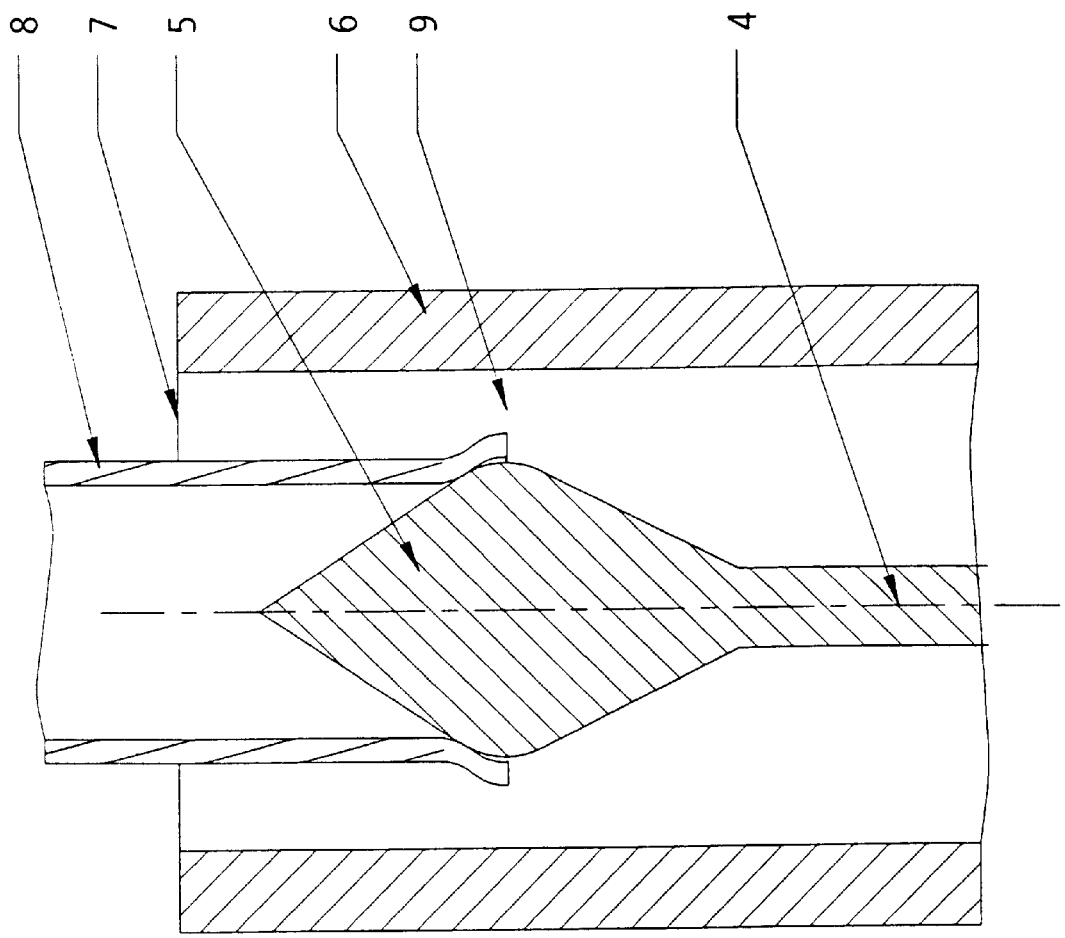
FIG. 3 a second embodiment of the antenna and the shielding device for widening tubular parts.

For welding two tubular parts 8, 8', the antenna 4 should be arranged coaxially in the tubular device 6 for shielding, as shown in FIG. 2, and it should have two ends 5, 5' that widen in a conical shape. Therefore, the two zones 9, 9' are especially narrow in a ring-shaped area between the free ends 5, 5' of the antenna 4 and the device 6 for shielding. Especially high electromagnetic field strengths are produced in these areas, and therefore heating of parts 8, 8' inserted into that area is especially great. The sections of the parts 8, 8' that are outside of the zone 9, however, are not heated. After the tubular parts 8, 8' are heated to a temperature above the melting point on an end face, the parts 8, 8' are removed from the device, the part of the device shown here is pivoted away and the tubular parts 8, 8' are welded together by pressing their molten end faces together. In order for the tubular parts 8, 8' to be optimally positionable in the device, a conically shaped dielectric medium 10, 10' is provided at the free ends 5, 5' of the antenna 4, its shape coordinated with the dimensions of the parts 8, 8' which are to be heated. The dielectrics 10, 10' also serve to cool the insides of the tubular parts 8, 8' to prevent a weld bead facing inward from being formed in welding. To widen the tubular parts 8, the antenna 4 should also be arranged coaxially with the shield 6 in the tubular device and should have a mandrel-shaped end 5 which has rotational symmetry, as illustrated in FIG. 3. With this embodiment, the zone 9 between the free end 5 of the antenna 4 and the device for shielding 6 is especially narrow in a ring-shaped area, so especially high electromagnetic field strengths prevail in this area, heating the mechanically widened part 8 which has been inserted into zone 9 to a temperature above the temperature of plastic deformation, thus bringing about a permanent shaping.

Figure 4:
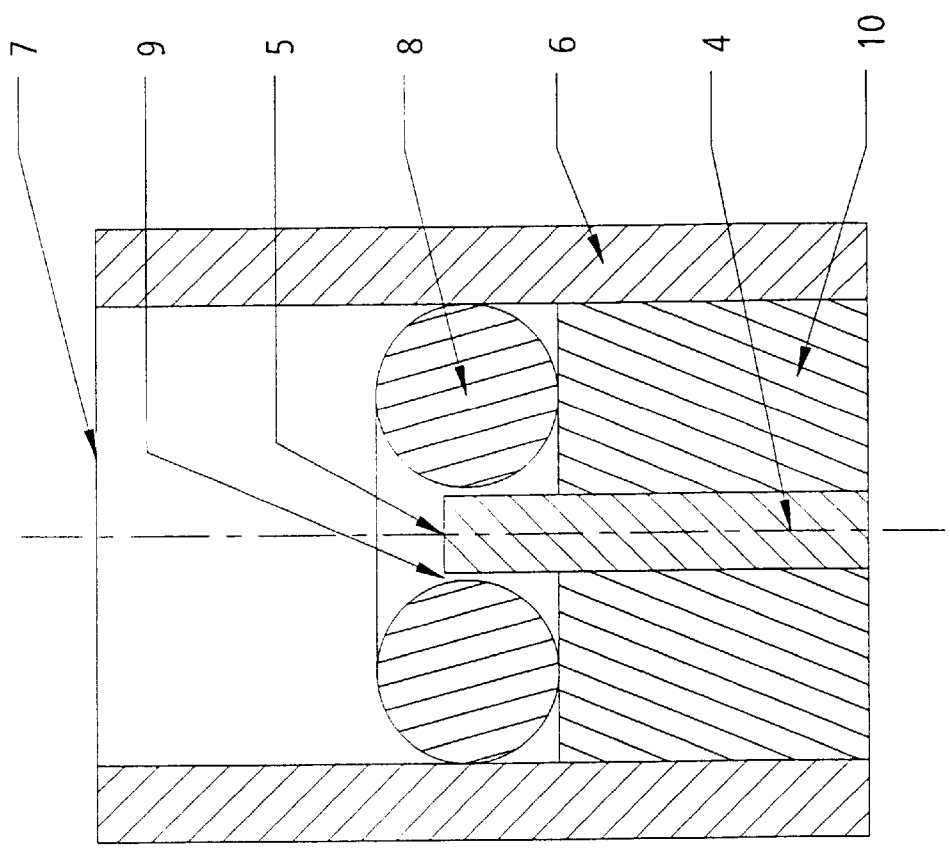
FIG. 4 a third embodiment of the antenna and the shielding device for shaping elongated parts having a circular cross section.

For shaping the parts 8, the antenna 4 has a rotationally symmetrical rod-shaped end 5, as illustrated in FIG. 4, so the elongated part 8 having a circular cross section to be deformed is inserted into the zone 9 between the free end 5 of the antenna 4 and the device for shielding 6 and is permanently shaped into a ring-shaped part 8 by heating it to a temperature above the temperature of plastic deformation. In this embodiment, the dielectric 10 is provided between the antenna 4 and the device 6, serving as a contact surface or to receive part 8 there.

Figure 5:
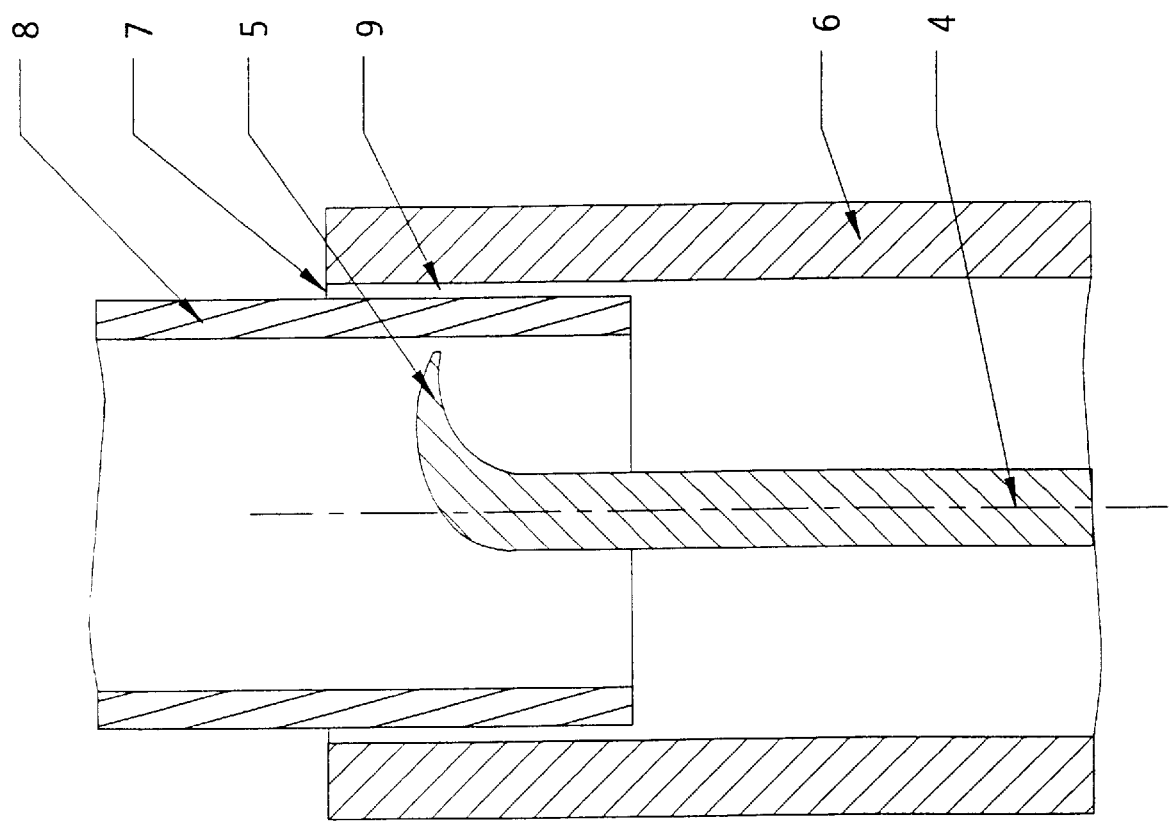
FIG. 5 a fourth embodiment of the antenna and the shielding device for crosslinking tubular parts.

For crosslinking tubular parts 8, the antenna 4 should have a hook-shaped design on its free end 5, as illustrated in FIG. 5. Thus, the zone 9 between the free end 5 of the antenna 4 and the device for shielding 6 is especially narrow in the area of the bent and tapered end 5, so this point-shaped area is suitable for crosslinking stationary parts 8 in certain areas and moving parts 8 along certain lines. It would also be conceivable for the hook-shaped antenna to be rotated about its longitudinal axis, so that stationary parts could be crosslinked along a circular path. A rod-shaped antenna arranged coaxially in the device for shielding and having a non-circular cross section or an antenna not arranged coaxially in the device for shielding would also be suitable for crosslinking parts.

In all these embodiments, the shape of the free end of the antenna and the diameter of the device for shielding determine the extent of the zone. If the antenna and the device for shielding are a small distance apart, this results in a narrow zone, while a great distance results in a wide zone. Furthermore, a free end of the antenna with a soft contour leads to a long zone, whereas a free end of the antenna with a sharp contour leads to a short zone.

What is claimed is:

1. Device for heating parts made of a microwave absorbing plastic, having
    a microwave generator which generates microwaves of a certain wavelength,
    an antenna to which the microwaves are sent, having at least one free end, and
    a device for shielding which surrounds the antenna, wherein the device for shielding (6) comprises a tubular shape, said device (6) having an inside diameter smaller than half the wavelength, projecting beyond the free end (5) of the antenna (4) and having an opening (7) in the end face, a zone (9) positioned between the free end of the antenna (4) on the tubular device for shielding (6) so that parts inserted into said zone (9) can be heated in a spatially limited or precisely defined area.

2. Device according to claim 1, characterized in that the tubular device for shielding (6) projects beyond the free end (5) of the antenna (4) by at least one quarter of the wavelength.

3. Device according to claim 1, wherein the zone (9) between the free end (5) of the antenna (4) and the device for shielding (6) is designed with dimensions in accordance with the dimensions of the parts (8) to be heated.

4. Device according to one of claim 3, wherein the zone (9) is designed to be especially narrow between the free end of the antenna (4) and the tubular device for shielding (6) in a certain area in order to heat the parts (8) introduced into this zone (9) in a spatially limited or precisely defined area.

5. Device according to claim 4, wherein the parts (8) introduced into the zone (9) can be heated within the narrow area in accordance with the respective requirements.

6. Device according to claim 1, wherein a dielectric (10) is provided between the antenna (4) and the device for shielding (6).

7. Device according to claim 1, wherein the free end (5) of the antenna (4) is designed in a conical shape.

8. Device according to claim 1, wherein the free end (5) of the antenna (4) is designed in the shape of a mandrel.

9. Device according to claim 1, wherein the free end (5) of the antenna is designed in a rod shape.

10. Device according to claim 1, wherein the free end (5) of the antenna (4) is designed in a hook shape.

11. Device according to claim 1, wherein the free end (5) of the antenna (4) and the tubular device for shielding (6) are arranged coaxially with one another.

12. Method of heating parts made of a microwave absorbing plastic by providing a device according to claim 1 and heating the parts with said device.

13. Method according to claim 12, wherein parts (8, 8') are heated to a temperature above a melting point and are welded together in the zone (9, 9') between the free end (5,5') of the antenna (4) and the device for shielding (6).

14. Method according to claim 12, wherein parts (8) are heated to a temperature above a temperature of plastic deformation and undergo permanent deformation in the zone (9) between the free end (5) of the antenna (4) and the device for shielding (6).

15. Method according to claim 12, wherein parts (8) are heated to a temperature above a crosslinking temperature and are crosslinked in the zone (9) between the free end (5) of the antenna and the device for shielding (6).

* * * * *